(12) United States Patent
Hikosaka

(10) Patent No.: US 9,594,221 B2
(45) Date of Patent: Mar. 14, 2017

(54) OPTICAL CONNECTOR

(71) Applicant: YAZAKI CORPORATION, Minato-ku, Tokyo (JP)

(72) Inventor: Tomohiro Hikosaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/729,194

(22) Filed: Jun. 3, 2015

(65) Prior Publication Data

US 2015/0355423 A1 Dec. 10, 2015

(30) Foreign Application Priority Data

Jun. 5, 2014 (JP) .................................. 2014-116622

(51) Int. Cl.
*G02B 6/44* (2006.01)
*G02B 6/42* (2006.01)

(52) U.S. Cl.
CPC ......... *G02B 6/4234* (2013.01); *G02B 6/4204* (2013.01); *G02B 6/426* (2013.01); *G02B 6/4245* (2013.01); *G02B 6/4246* (2013.01); *G02B 6/4292* (2013.01)

(58) Field of Classification Search
None
See application file for complete search history.

(56) References Cited

U.S. PATENT DOCUMENTS

| 4,808,115 | A | * | 2/1989 | Norton | .................. G02B 6/381 361/721 |
| 2008/0019643 | A1 | * | 1/2008 | Teo | ...................... G02B 6/4292 385/76 |
| 2010/0232751 | A1 | * | 9/2010 | Biwa | ..................... G02B 6/4201 385/93 |

FOREIGN PATENT DOCUMENTS

JP 2011-197275 A 10/2011

* cited by examiner

*Primary Examiner* — Sung Pak
*Assistant Examiner* — Hoang Tran
(74) *Attorney, Agent, or Firm* — Mots Law, PLLC

(57) ABSTRACT

An optical connector includes an optical transceiver having an optical element, a case that covers the optical element, and a plurality of terminals that are externally protruded from a terminal projecting surface of the case, and a connector housing having a housing chamber that houses the optical transceiver. The terminal projecting surface of the case is formed as a flat reference plane. A surface which forms the housing chamber and to which the terminal projecting surface of the case abuts is formed as a flat position-correction surface. A pair of projections are formed on a surface which forms the housing chamber and which is opposite to the position-correction surface.

17 Claims, 6 Drawing Sheets

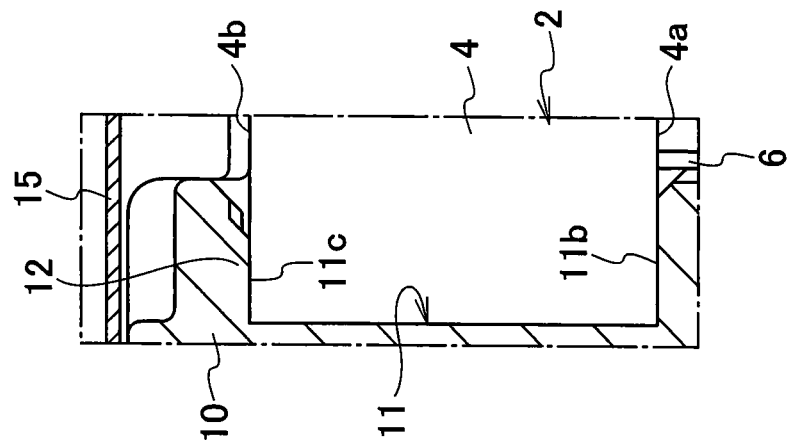
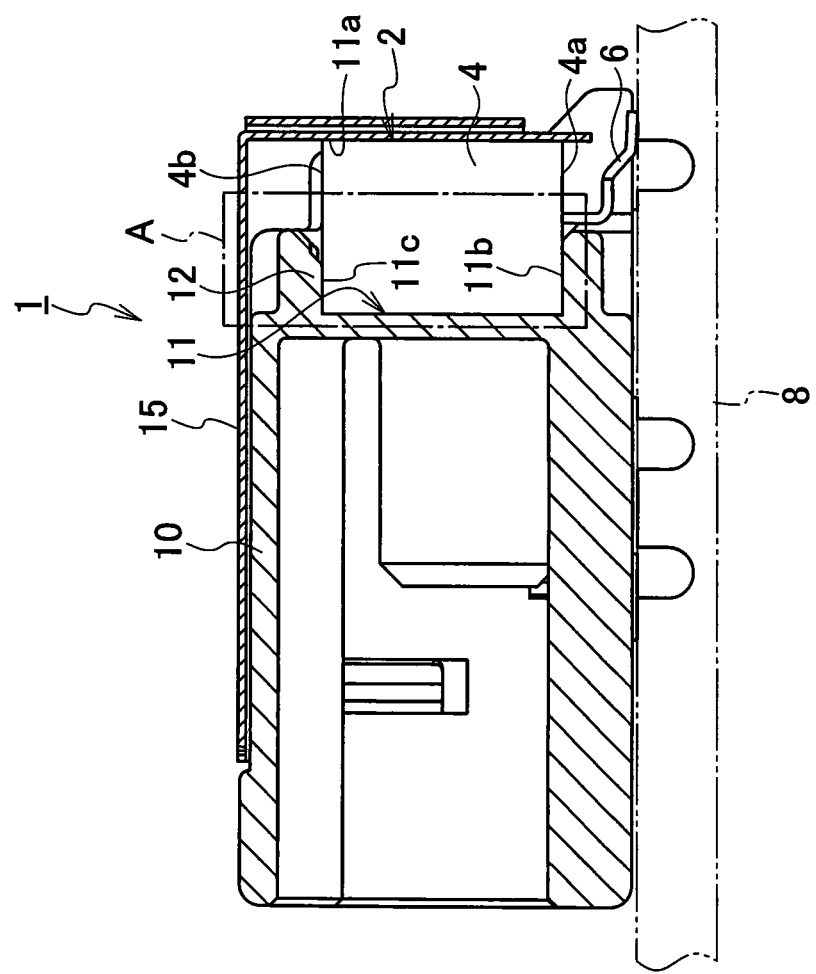

OPTICAL CONNECTOR

CROSS REFERENCE TO RELATED APPLICATION

The present application is based on, and claims priority from Japanese Patent Application No. 2014-116622, filed Jun. 5, 2014, the disclosure of which is hereby incorporated by reference herein in its entirety.

TECHNICAL FIELD

The present application relates to an optical connector having an optical transceiver that performs optical transmission with a counterpart ferrule.

BACKGROUND

A conventional optical connector 100 is illustrated in FIGS. 1A, 1B, and 2 (refer to JP 2011-197275 A). The conventional optical connector 100 includes an optical transceiver (FOT: Fiber Optical Transceiver) 101 and a connector housing 110 which houses the optical transceiver 101. The optical transceiver 101 includes an optical element 102 that performs optical transmission with a counterpart ferrule (not illustrated), a case 103 that covers the optical element 102, and a plurality of terminals 104 protruded externally from a terminal projecting surface 103a of the case 103. At a rear end side (a right side of FIG. 1B) of the connector housing 110, a housing chamber 111 that houses the optical transceiver 101 is formed. The housing chamber 111 is formed with one face 111a on which an opening is provided (the lower surface of FIG. 1B) and the faces which can abut three sides of the optical transceiver 101 housed therein. At the front end side (the left side of FIG. 1B) of the connector housing 110, a ferrule guide 112 is formed, into which an end of an optical fiber 120 is inserted.

In the above structure, the optical transceiver 101 is inserted from the one face 111a of the housing chamber 111 inside the connector housing 110 having an opening (the lower surface of FIG. 1B). This allows positioning of the optical transceiver 101 in the connector housing 110 since three sides of the optical transceiver 101 abut the respective faces formed in the housing chamber 111 inside the connector housing 110. As a result, an optical axis of the optical transceiver 101 coincides with an optical axis C1 of the optical fiber 120, and light transmission between the optical fiber 120 and the optical transceiver 101 can be performed smoothly.

SUMMARY

In the optical connector 100 of the conventional example, it is necessary that the width size W1 of the housing chamber 111 is made to have a slightly larger size than the width (dimensions between the sides) W2 of the optical transceiver 101 in order to enable insertion of the optical transceiver 101 into the housing chamber 111 inside the connector housing 110. However, when the width size W1 of the housing chamber 111 is larger than the width W2 of the optical transceiver 101 as such, the housed optical transceiver 101 shifts its position in a rotation direction due to this difference in dimension (W1−W2).

Therefore, the present application was made to solve the above-described problem and aims to provide an optical connector which can prevent positional displacement of the optical transceiver in a rotation direction with respect to the connector housing as much as possible.

An optical connector according to the present application includes an optical transceiver having an optical element, a case that covers the optical element, and a plurality of terminals that are externally protruded from a terminal projecting surface of the case, and a connector housing having a housing chamber that houses the optical transceiver. The terminal projecting surface of the case is formed as a flat reference plane. A surface which forms the housing chamber and to which the terminal projecting surface of the case abuts is formed as a flat position-correction surface. A projection is formed on a surface which forms the housing chamber and which is opposite to the surface to which the terminal projecting surface of the case abuts.

Preferably, the terminals are arranged at intervals along the longitudinal direction of the terminal projecting surface, and in a state that the connector housing is mounted on a mounting substrate, tip ends of the terminals are surface contacted to the mounting substrate and are surface mounted.

Preferably, the housing chamber of the connector housing is provided with an opening on a face opposite to a side from which a counterpart connector is mounted, and the optical transceiver is inserted into the housing chamber from the opening.

With the optical connector according to the present invention, when the optical transceiver is inserted into the housing chamber of the connector housing, the terminal projecting surface of the case is pressed against the position-correction surface of the connector housing by a returning deformation force of the projection provided on the housing chamber of the connector housing, and therefore, the optical transceiver is housed in the connector housing in a positioned state. Thus, positional displacement of the optical transceiver in a rotation direction with respect to the connector housing can be prevented as much as possible.

BRIEF DESCRIPTION OF DRAWINGS

FIG. 4A is a sectional view of the optical connector according to the embodiment, and FIG. 4B is an enlarged view of part A of FIG. 4A.

DESCRIPTION OF EMBODIMENTS

Figure 1A:
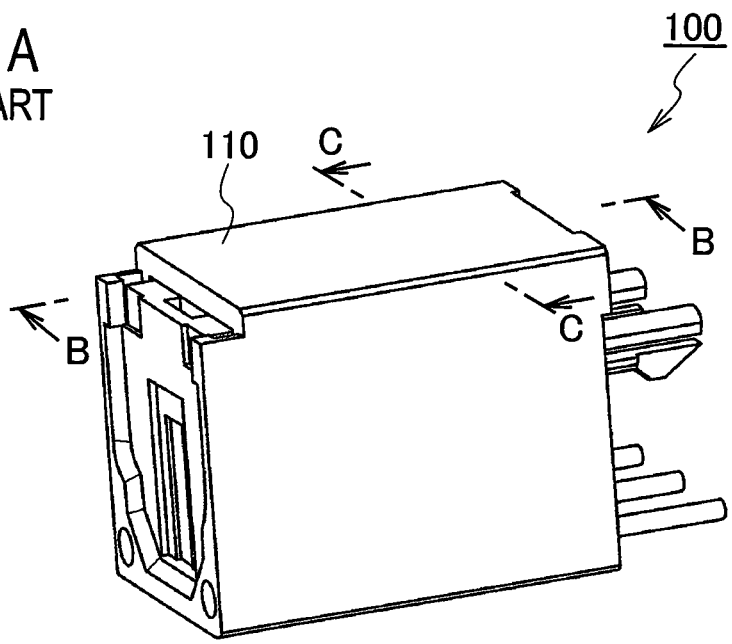
FIG. 1A is a perspective view of a conventional optical connector.
Figure 1B:
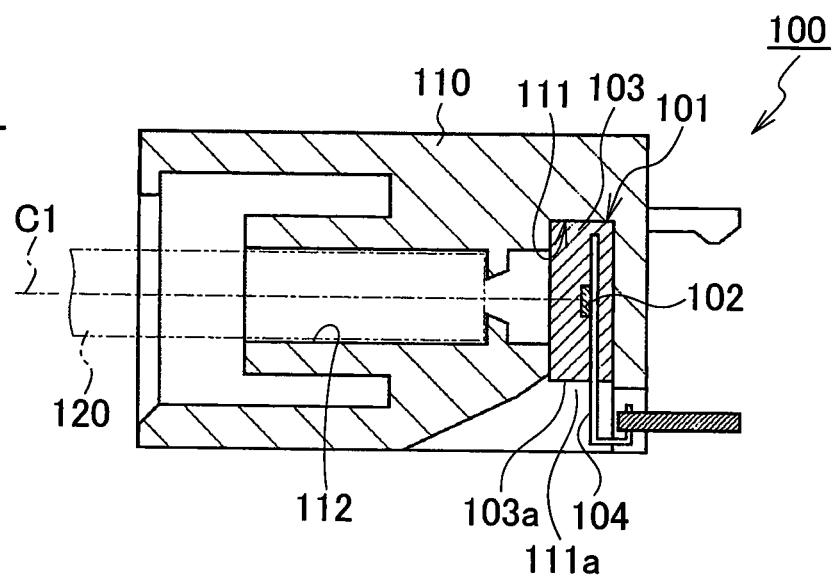
FIG. 1B is a cross-sectional view taken along line B-B of FIG. 1A.
Figure 2:
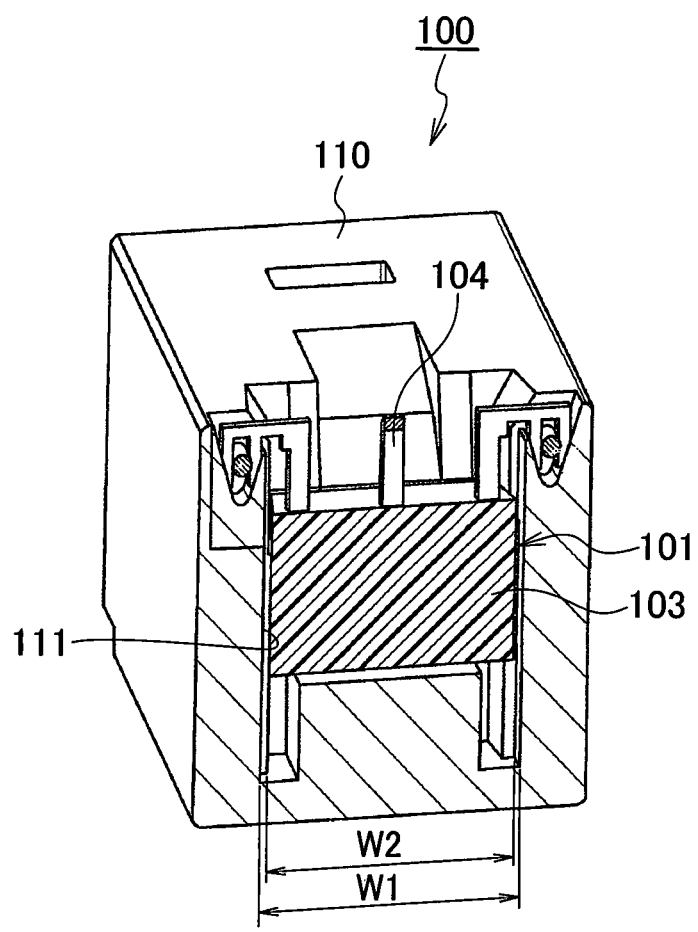
FIG. 2 is a cross-sectional view taken along line C-C of FIG. 1A.
Figure 3:
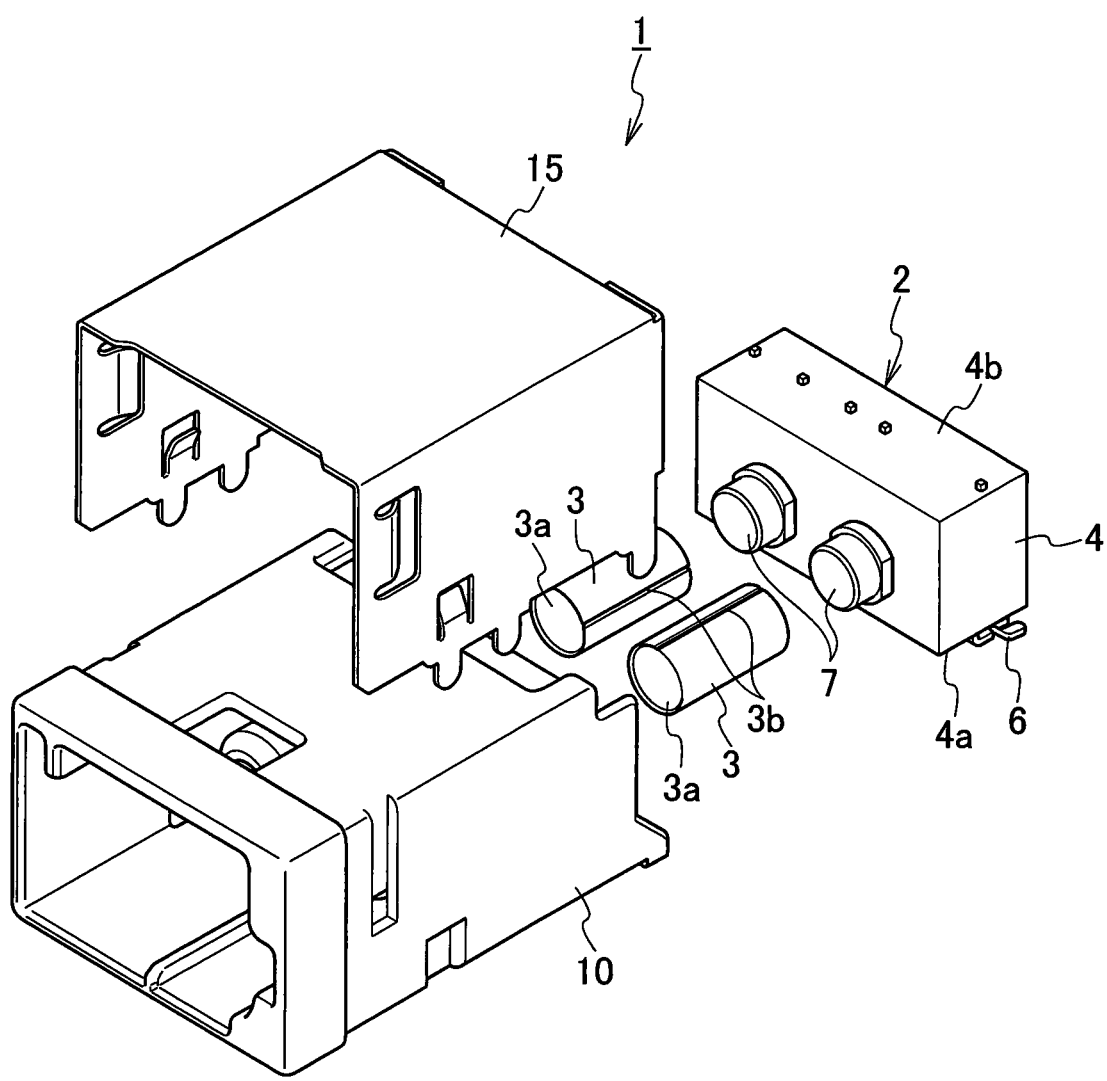
FIG. 3 is an exploded perspective view of an optical connector according to an embodiment.
Figure 5A:
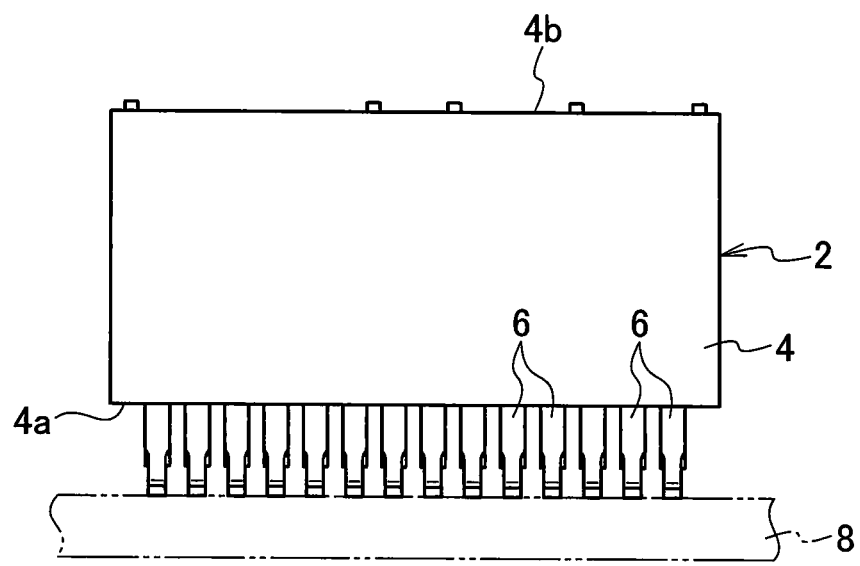
FIG. 5A is a rear view of an optical transceiver according to the embodiment.
Figure 5B:
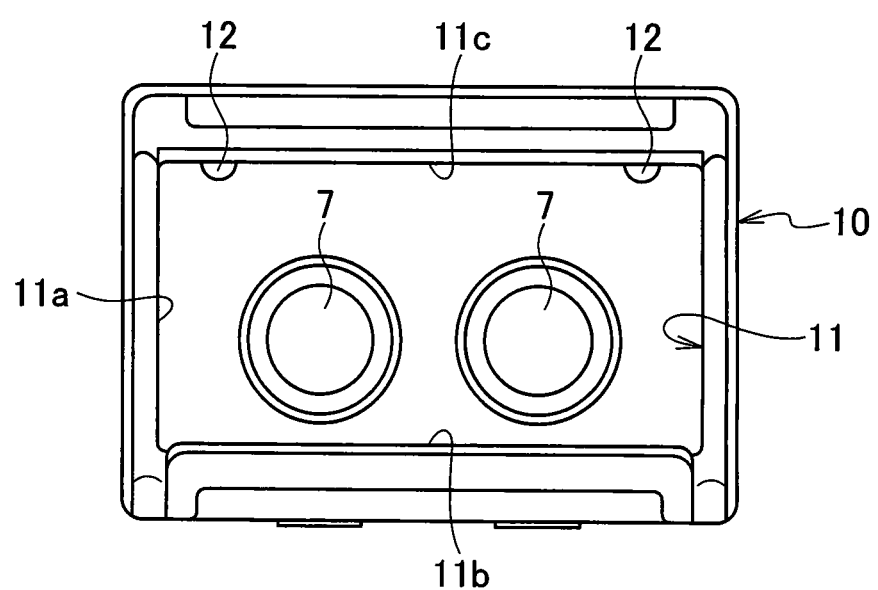
FIG. 5B is a rear view of a connector housing according to the embodiment.

Hereinafter, an optical connector according to an embodiment will be explained by referring to the drawings.

FIGS. 3, 4A, 4B, 5A, 5B, and 6A illustrate an optical connector 1 according to the embodiment. The optical connector 1 according to the embodiment includes an optical transceiver 2, a connector housing 10 which houses the optical transceiver 2, and a shield case 15 which covers an outer periphery of the connector housing 10.

The optical transceiver 2 includes sleeves 3 having ferrule insertion holes 3a into which counterpart ferrules (not illustrated) are inserted, optical elements (not illustrated) which are mounted on a lead frame (not illustrated) and which perform optical transmission with the counterpart ferrules, a case 4 which covers the optical elements, a plurality of terminals 6 protruded externally from a terminal projecting surface 4a of the case 4, and spherical lenses 7 arranged on the optical paths between the counterpart ferrules and the case 4.

Each of the sleeves 3 is formed in a cylindrical shape. The lens 7 is fixed to the ferrule insertion hole 3a inside each of the sleeves 3. Each of the sleeves 3 has a slit 3b which extends in the direction of its axis.

The terminals 6 are extended from the lead frame (not illustrated) buried inside the case 4. Each of the terminals 6 is arranged at intervals along the longitudinal direction of the terminal projecting surface 4a. In a state that the connector housing 10 is mounted on a mounting substrate 8, a tip end of each of the terminals 6 is surface contacted to the mounting substrate 8 and is surface mounted.

At the front end side (the left side of FIG. 4A) within the connector housing 10, a counterpart connector housing (not illustrated) is mounted from forward. The housing chamber 11 of the connector housing 10 has an opening on the face opposite to the side to which the counterpart connector housing is mounted (the right side of FIG. 4A), and the optical transceiver 2 is inserted into the housing chamber 11 from the opening 11a.

The terminal projecting surface 4a of the case 4 is formed as a flat reference plane. The bottom face of the housing chamber 11 of the connector housing 10 is a face that forms the housing chamber 11 as well as a face to which the terminal projecting surface 4a of the case 4 abuts, and is formed as a flat position-correction surface 11b. A ceiling surface 11c of the housing chamber 11 of the connector housing 10 is a face that forms the housing chamber 11 as well as an opposite surface to the face on which the terminal projecting surface 4a of the case 4 abuts. On the ceiling surface 11c, a pair of projections 12 capable of compressive deformation are provided at left-right symmetrical positions in the width direction and to extend in the insertion direction of the optical transceiver 2.

Next, an assembling order of the optical transceiver 2 will be explained. First, a dummy ferrule (not illustrated) is inserted into the tip end side of the ferrule insertion hole 3a of each of the sleeves 3, and by utilizing the slit 3b to reduce diameter of the sleeve 3, the sleeve 3 is closely fitted to an outer periphery of the dummy ferrule. Thus, the sleeve 3 having the same axis as the central axis of the dummy ferrule is manufactured. When the lens 7 having the same diameter as that of the dummy ferrule is inserted into the rear end side of the ferrule insertion hole 3a of the sleeve 3 and is fixed by an adhesive or the like, the sleeve 3 with the lens 7 is manufactured in which the central axis of the lens 7 and the central axis of the sleeve 3 coincide.

Next, the sleeves 3 with the lens 7 and assembling parts of the case 4 are set in the connector housing 10. At that time, the optical transceiver 2 is inserted into the housing chamber 11 from the opening 11a on the rear side of the housing chamber 11 of the connector housing 10, making the pair of projections 12 provided on the ceiling surface 11c of the housing chamber 11 abut the top face 4b of the case 4, and making the terminal projecting surface 4a of the case 4 abut the position-correction surface 11b. This causes compression deformation of the pair of projections 12, and the terminal projecting surface 4a of the case 4 is pressed against the position-correction surface 11b of the housing chamber 11 of the connector housing 10 with their returning deformation force.

After the optical connector 1 is assembled as such, the connector housing 10 is mounted on the mounting substrate 8, and the optical connector 1 is surface mounted on the mounting substrate 8 in a state that the tip ends of the terminals 6 that protrude from the terminal projecting surface 4a of the case 4 are surface contacted to the mounting substrate 8.

As explained above, in the optical connector 1, the terminal projecting surface 4a of the case 4 is pressed against the position-correction surface 11b of the housing chamber 11 of the connector housing 10 by a returning deformation force of the pair of projections 12 provided on the ceiling surface 11c of the housing chamber 11 of the connector housing 10. Therefore, since the optical transceiver 2 is housed in the connector housing 10 in a positioned state, positional displacement of the optical transceiver 2 in a rotation direction with respect to the connector housing 10 can be prevented as much as possible.

As noted above, since the positional displacement of the optical transceiver 2 in a rotation direction with respect to the connector housing 10 can be prevented as much as possible, the bottom faces of the terminals 6 are positioned on the same plane, and mounting accuracy of the optical connector 1 on the mounting substrate 8 is improved.

The housing chamber 11 of the connector housing 10 has the opening 11a at the face opposite to the side on which the counterpart connector is mounted, and the optical transceiver 2 is inserted into the housing chamber 11 from the opening 11a. Thus, since it is sufficient to insert the optical transceiver 2 into the housing chamber 11 while causing compression deformation of the pair of projections 12, housing operations of the optical transceiver 2 become easy.

In the embodiment, a pair of left and right projections 12 are provided on the opposite face 11c to the face on which the terminal projecting surface 4a of the case 4 is abutted, but it can take other forms as long as it can press the terminal projecting surface 4a of the case 4 over the whole area of the position-correction surface 11b of the housing chamber 11 of the connector housing 10. Therefore, it may be a single wide projection 12 provided at the central position in the lateral direction, or three or more projections 12 may be provided.

Figure 6A:
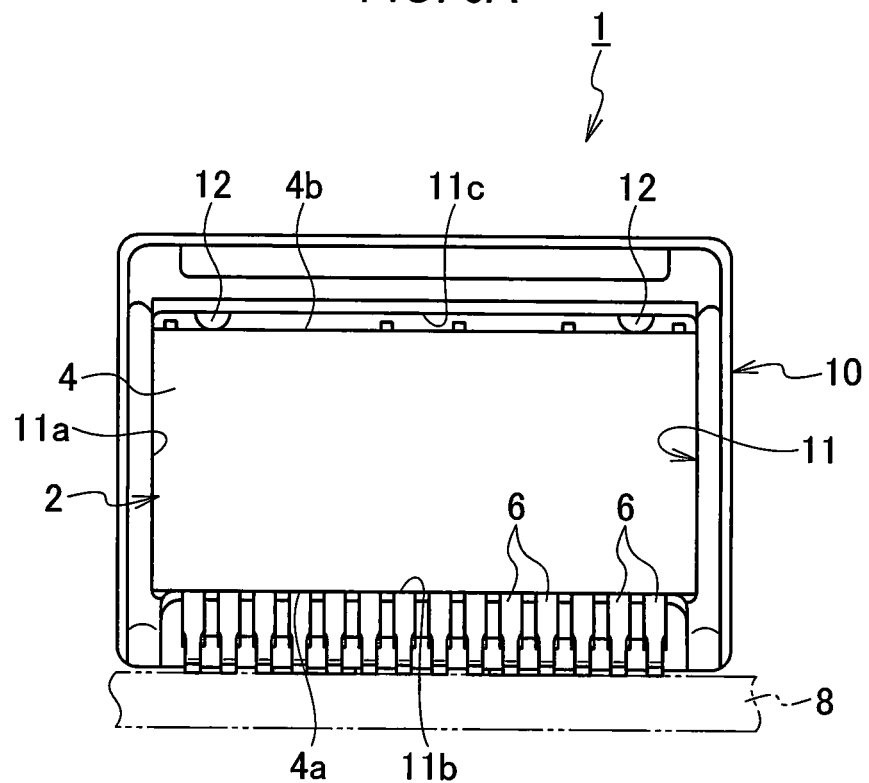
FIG. 6A is a rear view of the optical connector according to the embodiment.
Figure 6B:
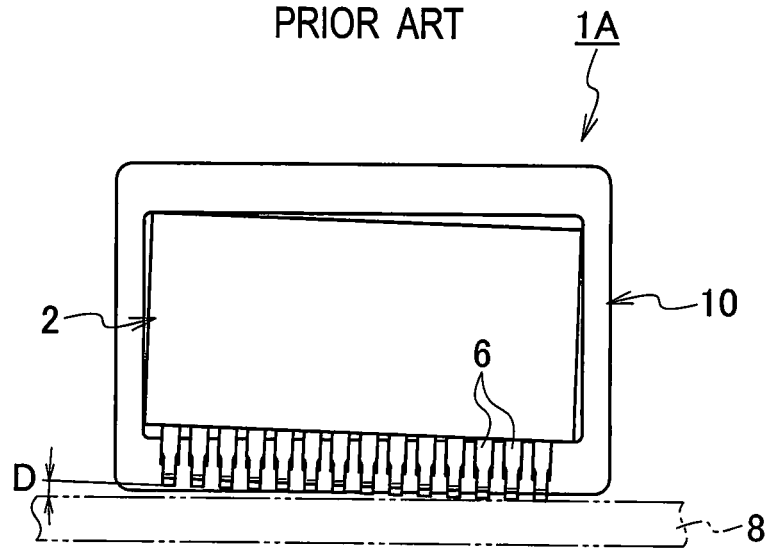
FIG. 6B is a rear view of the optical connector according to a comparative example.

With one that causes positional displacement D in a rotation direction with respect to the connector housing 10 of the optical transceiver 2 as in an optical connector 1A of a comparative example as illustrated in FIG. 6B, the height positions of the tip ends of a plurality of terminals 6 do not come to the same position with respect to the attaching face of the mounting substrate 8, and thus, surface mount accuracy of the optical connector 1A becomes deteriorated.

Whereas, with the optical connector 1 according to the embodiment, as illustrated in FIG. 6A, positional displacement of the optical transceiver 2 in a rotation direction with respect to the connector housing 10 can be prevented. Therefore, the height positions of the tip ends of the terminals 6 come to the same position, and the optical connector 1 is surface mounted in the state that the tip ends of all the terminals 6 are surface contacted to the mounting substrate 8.

What is claimed is:

1. An optical connector, comprising:
  an optical transceiver having an optical element, a case that covers the optical element, and a plurality of terminals that are externally protruded from a terminal projecting surface of the case; and a connector housing having a housing chamber that houses the optical transceiver, wherein the terminal projecting surface of the case is formed as a flat reference plane, a surface which forms the housing chamber and to which the terminal projecting surface of the case abuts is formed as a flat position-correction surface, and a projection is formed on a surface which forms the housing chamber and which is opposite to a side from which the surface to which the terminal projecting surface of the case abuts, the projection is compressively deformable such that the projection abuts a top surface of the case and presses the terminal projecting surface of the case against the flat position-correction surface, wherein the terminal projecting surface of the case is pressed against the position-correction surface of the housing chamber of the connector housing by a returning deformation force of the projection such that the optical transceiver is housed in the connector housing in a position corrected state and a positional displacement of the optical transceiver in a rotation direction with respect to the connector housing is prevented by the returning deformation force of the projection.

2. The optical connector according to claim 1, wherein the terminals are arranged at intervals along the longitudinal direction of the terminal projecting surface, and in a state that the connector housing is mounted on a mounting substrate, tip ends of the terminals are surface contacted to the mounting substrate and are surface mounted.

3. The optical connector according to claim 1, wherein the housing chamber of the connector housing is provided with an opening at a face opposite to a side from which a counterpart connector is mounted, and the optical transceiver is inserted into the housing chamber from the opening.

4. The optical connector according to claim 1, wherein the optical transceiver includes sleeves having ferrule insertion holes, and spherical lenses fixed to the ferrule insertion hole inside each of the sleeves.

5. The optical connector according to claim 4, wherein each of the sleeves has a slit extending in the direction of an axis of the sleeve.

6. The optical connector according to claim 1, wherein the flat position-correction surface comprises a bottom face of the housing chamber.

7. The optical connector according to claim 1, wherein the projection is formed on a ceiling surface of the housing chamber of the connector housing.

8. The optical connector according to claim 1, wherein the projection comprises a pair of projections formed on the ceiling surface of the housing chamber of the connector housing.

9. The optical connector according to claim 8, wherein pair of projections are provided at left-right symmetrical positions in the width direction of the housing chamber.

10. The optical connector according to claim 8, wherein the optical transceiver is provided in inserted relation into the housing chamber from an opening on a rear side of the housing chamber of the connector housing such that the pair of projections abut a top face of the case and thereby cause the terminal projecting surface of the case to abut the position-correction surface.

11. The optical connector according to claim 10, wherein the pair of projections abut the top face of the case causing compression deformation of the pair of projections such that the terminal projecting surface of the case is pressed against the position-correction surface of the housing chamber of the connector housing.

12. The optical connector according to claim 11, wherein, the terminal projecting surface of the case is pressed against the position-correction surface of the housing chamber of the connector housing by a returning deformation force of the pair of projections provided on the ceiling surface of the housing chamber of the connector housing.

13. The optical connector according to claim 12, wherein, the terminal projecting surface of the case is pressed against the position-correction surface of the housing chamber of the connector housing by the returning deformation force of the pair of projections provided on the ceiling surface of the housing chamber of the connector housing such that the optical transceiver is housed in the connector housing in the position corrected state and the positional displacement of the optical transceiver in the rotation direction with respect to the connector housing is prevented by the returning deformation force of the pair of projection portions.

14. The optical connector according to claim 1, wherein the positional displacement of the optical transceiver in a rotation direction with respect to the connector housing is prevented such that bottom faces of the plurality of terminals are positioned on the same plane and mounting accuracy of the optical connector on a mounting substrate is improved.

15. The optical connector according to claim 1, wherein, the projection presses the terminal projecting surface of the case over a whole area of the position-correction surface of the housing chamber of the connector housing.

16. The optical connector according to claim 15, wherein, the projection comprises a single wide projection provided at a central position in the lateral direction of the housing.

17. The optical connector according to claim 15, wherein, the projection comprises three or more projections.

* * * * *